United States Patent
Hosomi

(10) Patent No.: US 10,434,824 B2
(45) Date of Patent: Oct. 8, 2019

(54) PNEUMATIC TIRE

(71) Applicant: Toyo Tire & Rubber Co., Ltd., Osaka-shi, Osaka (JP)

(72) Inventor: Kazumasa Hosomi, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 530 days.

(21) Appl. No.: 14/924,959

(22) Filed: Oct. 28, 2015

(65) Prior Publication Data
US 2016/0121657 A1   May 5, 2016

(30) Foreign Application Priority Data
Oct. 31, 2014   (JP) ................................ 2014-222863

(51) Int. Cl.
*B60C 11/03*      (2006.01)
*B60C 11/00*      (2006.01)
*B60C 11/13*      (2006.01)

(52) U.S. Cl.
CPC ........ *B60C 11/033* (2013.01); *B60C 11/0083* (2013.01); *B60C 11/0306* (2013.01);
(Continued)

(58) Field of Classification Search
CPC ............. B60C 11/0083; B60C 11/1376; B60C 11/1392; B60C 11/033; B60C 11/0332;
(Continued)

(56) References Cited

U.S. PATENT DOCUMENTS

| | | | |
|---|---|---|---|
| 2007/0199634 A1* | 8/2007 | Sakamaki | ............... B60C 11/11 152/209.23 |
| 2010/0186861 A1* | 7/2010 | Ishiguro | .............. B60C 11/0306 152/209.25 |

(Continued)

FOREIGN PATENT DOCUMENTS

| | | | |
|---|---|---|---|
| JP | 04191104 A | * 7/1992 | .............. B60C 11/11 |
| JP | 2004-122904 A | 4/2004 | |

(Continued)

OTHER PUBLICATIONS

Office Action dated Dec. 23, 2016, issued in counterpart Chinese Patent Application No. 201510713209.7, with partial English translation. (11 pages).
Office Action dated Mar. 13, 2018, issued in counterpart Japanese Application No. 2014-222863, with English translation (6 pages).

*Primary Examiner* — Steven D Maki
*Assistant Examiner* — Philip N Schwartz
(74) *Attorney, Agent, or Firm* — Westerman, Hattori, Daniels & Adrian, LLP

(57) ABSTRACT

A pneumatic tire includes: a tread portion; three or more main grooves provided on the tread portion at intervals in a tire width direction so as to extend in a tire circumferential direction; and a plurality of land portions partitioned between the main grooves adjacent to each other in the tire width direction, wherein the plurality of land portions include: ground contact areas having an arc shape in cross section in the tire width direction; and depressed portions opening to the ground contact areas, and the land portion having a larger ratio of opening surface area a of the depressed portions opening in the area between the main grooves adjacent to each other in the tire width direction with respect to surface area A of the area (a/A) has an arc-shaped ground contact area with a cross section in the tire width direction having a smaller radius of curvature.

3 Claims, 3 Drawing Sheets

(52) U.S. Cl.
CPC ..... *B60C 11/1376* (2013.01); *B60C 2011/039* (2013.01); *B60C 2011/0334* (2013.01); *B60C 2011/0341* (2013.01); *B60C 2011/0369* (2013.01); *B60C 2011/0372* (2013.01)

(58) Field of Classification Search
CPC ............ B60C 11/0306; B60C 11/0309; B60C 2011/0334; B60C 2011/0341; B60C 2011/0358; B60C 2011/0369; B60C 2011/0372; B60C 2011/039
USPC ........................................ 152/209.14, 209.15
See application file for complete search history.

(56) References Cited

U.S. PATENT DOCUMENTS

| | | | |
|---|---|---|---|
| 2013/0240101 | A1 | 9/2013 | Kameda |
| 2014/0166169 | A1* | 6/2014 | Tanaka ................ B60C 11/1376 152/209.15 |
| 2014/0311640 | A1* | 10/2014 | Takahashi ........... B60C 11/1376 152/209.15 |
| 2016/0009141 | A1 | 1/2016 | Suga |
| 2017/0297377 | A1* | 10/2017 | Honda ................ B60C 11/0304 |

FOREIGN PATENT DOCUMENTS

| | | |
|---|---|---|
| JP | 2005-263180 A | 9/2005 |
| JP | 2013-189121 A | 9/2013 |
| WO | 2014/129647 A1 | 8/2014 |

* cited by examiner

PNEUMATIC TIRE

BACKGROUND OF THE INVENTION

Field of the Invention

The present invention relates to a pneumatic tire.

Description of the Related Art

As a pneumatic tire, a tire having a tread pattern including a plurality of main grooves extending in a tire circumferential direction on a tread portion, and a plurality of land portions partitioned by the main grooves and provided with lateral grooves and sipes is known. A tire having such a tread pattern is generally subjected to deterioration of road-hugging property or generation of uneven wear due to non-uniform ground contact pressures of the plurality of land portions because the lateral grooves and the sipes are not provided evenly on the plurality of land portions.

JP-A-2005-263180 discloses a configuration in which ground contact areas of ribs formed between main grooves are protruded radially outward of a tire with respect to an outer contour line passing through the ground contact areas of shoulder ribs, and protruded apexes of the respective ribs are shifted inward with respect to center lines of the respective ribs in a state of being mounted on a vehicle in order to improve driving stability at the time of cornering by improving a ground-contact shape.

JP-A-2013-189121 discloses a configuration in which the ground contact areas of a center land portion and intermediate land portions are protruded by a predetermined amount radially outward of the tire with respect to a reference contour line of a tread portion and an amount of protrusion of the center land portion is formed to be larger than that of intermediate land portions in order to improve the road-hugging property entirely in a tire width direction of the tread portion and improve driving stability.

In this manner, JP-A-2005-263180 discloses a configuration in which the ground contact areas of the plurality of land portions are protruded and the protruded apexes are set to positions shifted from widthwise centers of the land portions, and JP-A-2013-189121 discloses a configuration in which the ground contact areas of the plurality of land portions provided on the tread portion are protruded by different amounts of protrusion. However, in these documents, non-uniformity of the ground contact pressure caused by the lateral grooves and the sipes provided on the land portions when protruding the ground contact areas of a block portions is not considered, so that deterioration of the road-hugging property and generation of uneven wear may not be restricted.

SUMMARY OF THE INVENTION

It is an object of the invention to provide a pneumatic tire provided with a tread portion having a plurality of land portions partitioned between main grooves that extends in a tire circumferential direction, the pneumatic tire being configured to restrict non-uniformity of ground contact pressure caused by lateral grooves and sipes provided on the land portions and to improve a road-hugging property and restrict generation of uneven wear.

A pneumatic tire according to the invention includes: a tread portion; three or more main grooves provided on the tread portion at intervals in a tire width direction so as to extend in a tire circumferential direction; and a plurality of land portions partitioned between the main grooves adjacent to each other in the tire width direction, and the plurality of land portions each include a ground contact area having an arc shape in cross section in the tire width direction, and a depressed portion opening to the ground contact area, and the land portion having a larger ratio of an opening surface area a of the depressed portion opening in the area with respect to a surface area A of an area between the main grooves adjacent to each other in the tire width direction (a/A) has an arc-shaped ground contact area having a smaller radius of curvature.

According to the invention, among the plurality of land portions provided on the tread portion, the land portion having a larger ratio of the opening surface area a of the depressed portion opening in the area with respect to the surface area A of the area between the main grooves adjacent to each other in the tire width direction (void ratio: a/A) has an arc-shaped ground contact area in cross section in the tire width direction having a smaller radius of curvature. Accordingly, rigidity can be enhanced by setting the land portion having a larger void ratio and a lower rigidity to have a ground contact area having a smaller radius of curvature and protruding the ground contact area radially outward of the tire to a large extent with respect to a reference contour line of the tread portion, so that the plurality of land portions are balanced in rigidity to uniformize the ground contact pressure, and uneven wear can be restricted.

DETAILED DESCRIPTION OF THE INVENTION

Figure 1:
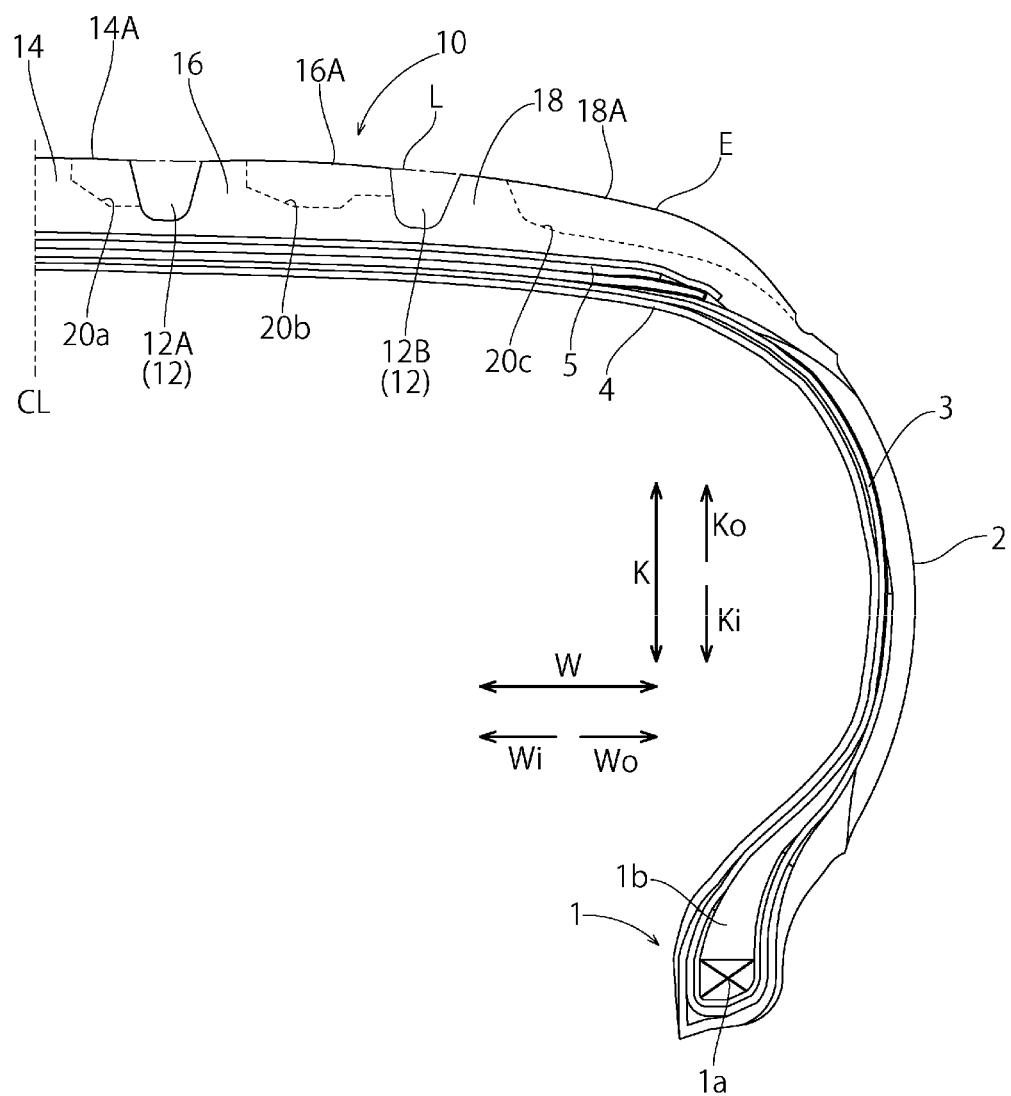
FIG. 1 is a half cross-sectional view of a pneumatic tire according to a first embodiment.

Referring now to the drawings, an embodiment of the invention will be described below.

Figure 2:
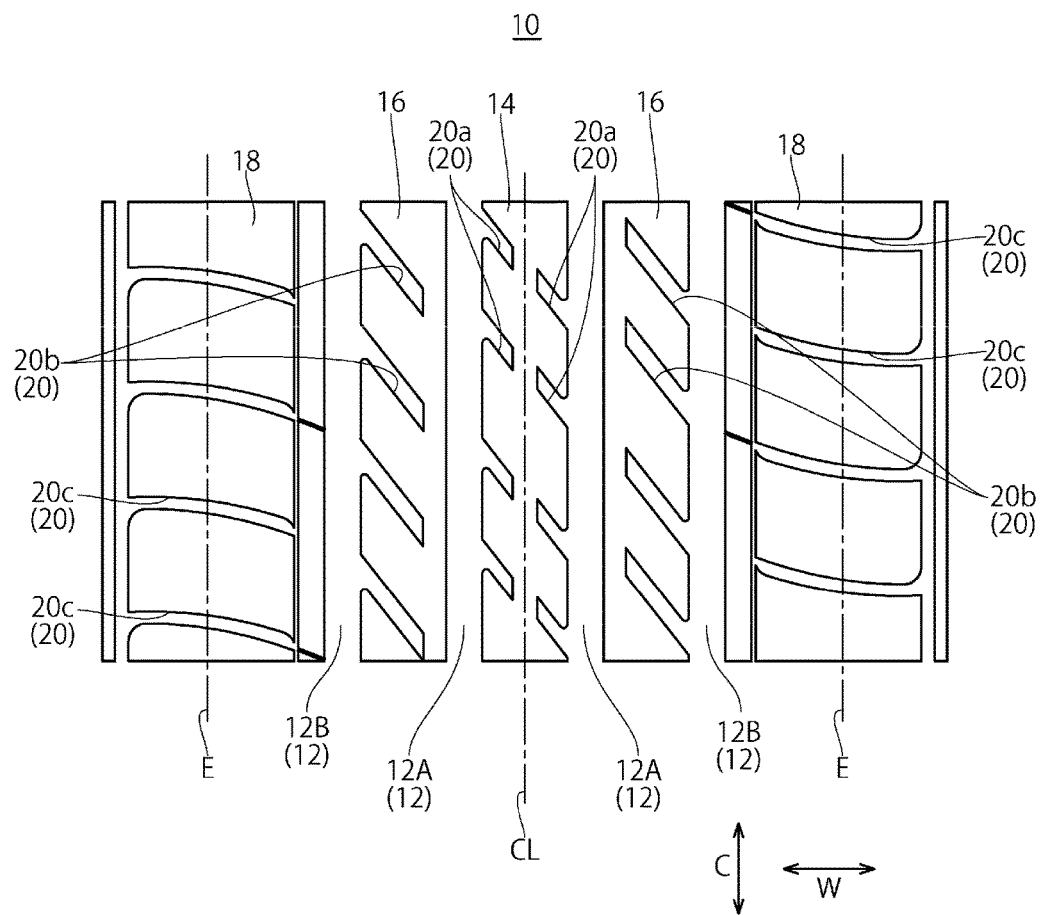
FIG. 2 is a developed view illustrating a tread pattern of the pneumatic tire according to the first embodiment.

FIG. 1 is a half cross-sectional view illustrating a periphery of a tread portion 10 of a pneumatic tire according to an embodiment taken along a tire width direction W (meridian direction), and FIG. 2 is a plan view of the tread portion 10.

The pneumatic tire is a radial tire including a pair of right and left bead portions 1, a pair of right and left side wall portions 2 extending from each of the right and left bead portions 1 to radially outside Ko of the tire, the tread portion 10 continuing to both of the outer peripheral ends of the right and left side wall portions 2, and a carcass 3 disposed so as to be bridged between the pair of bead portions 1.

In the bead portion 1, an annular bead core 1a formed of a bundled steel wires or the like covered with rubber and a bead filler 1b having a triangular shape in cross section and located radially outside Ko of the tire with respect to the bead core 1a are embedded.

The carcass 3 is rolled up so as to sandwich the bead cores 1a and the bead fillers 1b in-between and end portions thereof are locked with the bead cores 1a and the bead fillers 1b. An inner liner 4 configured to retain the air pressure is disposed inside the carcass 3.

A belt 5 formed of two or more rubber coated steel cord layers is provided in the tread portion 10 on an outer peripheral side of the carcass 3. The belt 5 reinforces the tread portion 10 on the outer periphery of the carcass 3.

Four main grooves 12 extending along a tire circumferential direction C as illustrated in FIG. 2 are provided on a surface of the tread portion 10. Specifically, the main grooves 12 include a pair of central main grooves 12A disposed on both sides of a tire equatorial plane CL and a pair of shoulder main grooves 12B provided outside Wo in a tire width direction of the pair of central main grooves 12A. The outside Wo in the tire width direction corresponds to a side away from the tire equatorial plane CL in the tire width direction W. The reference sign E indicates a tread ground contact end.

With the four main grooves 12 described above, the tread portion 10 is provided with a center land portion 14 formed between the two central main grooves 12A, intermediate land portions 16 each formed between the central main groove 12A and the shoulder main groove 12B, and shoulder land portions 18 formed outside Wo in the tire width direction of the two shoulder main grooves 12B.

As illustrated in FIG. 2, the land portions 14, 16, and 18 are provided respectively with lateral grooves 20 at intervals in the tire circumferential direction C. The lateral grooves 20 are grooves extending in a direction intersecting the tire circumferential direction C.

In this example, the center land portion 14 is provided with lateral grooves 20a opening to the central main grooves 12A and ending at a center portion of the center land portion 14 in the tire width direction W on both sides of the center land portion 14 in the tire width direction, and the intermediate land portions 16 are provided with lateral grooves 20b opening to the shoulder main grooves 12B and ending within the intermediate land portions 16. The lateral grooves 20a provided in the center land portion 14 and the lateral grooves 20b provided in the intermediate land portions 16 are inclined in substantially the same direction with respect to the tire width direction W, and are provided substantially parallel to each other. Lateral grooves 20c provided on the shoulder land portions 18 are grooves extending from inside Wi in the tire width direction to the outside Wo in the tire width direction beyond the tread ground contact ends E. The lateral grooves 20c open to side edges of the tread, and end within the shoulder land portions 18 so as not to open to the shoulder main grooves 12B.

According to the embodiment, the lateral grooves 20 may not be grooves which end halfway of the land portions 14, 16, and 18, and may be those separating the respective land portions 14, 16, and 18 completely and partitioning them into rows of blocks arranged in the tire circumferential direction C.

Void ratios indicating the ratios that openings of the lateral grooves 20a and 20b occupy in the ground contact area are different between the land portion partitioned between the main grooves 12 adjacent to each other in the tire width direction W, in this example, the center land portion 14 between the pair of central main grooves 12A and the intermediate land portions 16 between the central main grooves 12A and the shoulder main grooves 12B.

Here, the void ratio means a ratio of opening surface area a of the depressed portions provided in the land portion 14 or 16 located in the area between the main grooves 12 adjacent to each other in the tire width direction with respect to surface area A of the ground contact area in the area, and the depressed portions provided in the land portions 14 and 16 include not only the lateral grooves 20a and 20b, but also notches which are referred to as sipes, having a groove width (for example, 1 mm or smaller) small enough to close when the tire comes into contact with the ground under a normal load.

Void ratio Xa of the center land portion 14 is obtained by dividing surface area a1, which is a sum of surface areas of opened portions of all the lateral grooves 20a provided in the center land portion 14 by surface area A1 of the ground contact area in the area between the pair of central main grooves 12A (in other words, a total sum of the surface area of a ground contact area 14A of the center land portion 14 and surface area a1, which is a total of surface areas of the opened portions of the lateral grooves 20a provided in the center land portion 14), that is, (a1/A1).

Void ratio Xb of the intermediate land portion 16 is obtained by dividing surface area a2, which is a sum of surface areas of opened portions of the lateral grooves 20b provided in the intermediate land portion 16 by surface area A2 of the ground contact area in the area between the shoulder main groove 12B and the central main groove 12A (in other words, a total sum of the surface area of a ground contact area 16A of the intermediate land portion 16 and surface area a2, which is a total of surface areas of the opened portions of the lateral grooves 20b provided in the intermediate land portion 16), that is, (a2/A2). In this example, the void ratio Xb of the intermediate land portion 16 is larger than the void ratio Xa of the center land portion 14 (Xa<Xb).

The respective surface areas described above are surface areas obtained by measuring in a no-load regular state in which the pneumatic tire is mounted on a regular rim and is filled with a regular inner pressure. The regular rim is a "Standard Rim" in JATMA standard, a "Design Rim" in TRA standard, or a "Measuring Rim" in ETRTO standard. The regular inner pressure corresponds to "maximum air pressure" in JATMA standard, "maximum value" described in "TIRE LOAD LIMITS AT VARIOUS COLD INFLATION PRESSURES" in TRA standard, or "INFLATION PRESSURE" in ETRTO standard.

The cross-sectional shapes in the tire width direction of the ground contact areas 14A and 16A of the center land portion 14 between the pair of central main grooves 12A and the intermediate land portions 16 between the central main grooves 12A and the shoulder main grooves 12B respectively have an arcuate shape, and the ground contact areas 14A and 16A protrude radially outward Ko of the tire with respect to a reference contour line L of the tread portion 10 in a state of being filled to the regular inner pressure.

Figure 3:
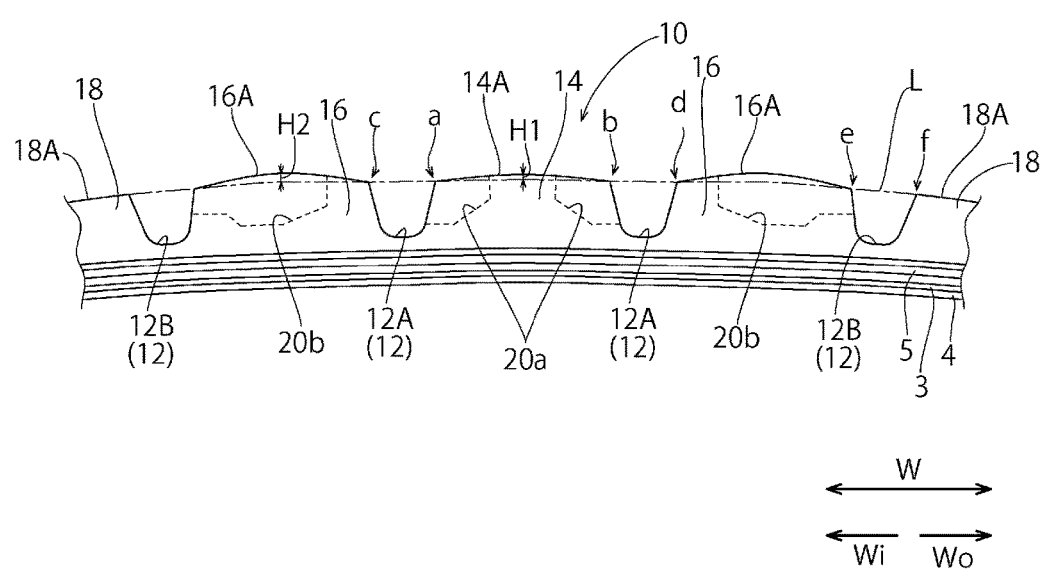
FIG. 3 is an enlarged cross-sectional view illustrating a principal portion of a tread portion partly enlarged from FIG. 1.

Specifically, as illustrated in FIG. 3, the cross section in the tire width direction of the ground contact areas 14A and 16A of the center land portion 14 and the intermediate land portions 16 has an arcuate shape passing through two points on an edge (opening ends of the main grooves which partition the land portion) on both sides of the land portions 14 and 16 in the tire width direction, and the ground contact areas 16A of the intermediate land portions 16 having a larger void ratio have an arc shape having a smaller radius of curvature than the radius of curvature of the arc shape of the ground contact area 14A of the center land portion 14 having a smaller void ratio.

Accordingly, the ground contact areas 14A and 16A of the center land portion 14 and the intermediate land portions 16 have an arc-shaped cross section protruding outward having an apex at a center in the tire width direction W, and a protruding amount H2 from the reference contour line L of the intermediate land portion 16 (the distance from the reference contour line L to the apex of the ground contact area 16A) is set to be larger than a protruding amount H1 from the reference contour line L of the center land portion 14 (the distance from the reference contour line L to the apex of the ground contact area 14A) (H1<H2), and the rigidity of the intermediate land portions 16 is improved to be higher than that of the center land portion 14.

In this embodiment, as illustrated in FIG. 2, the tread portion 10 of the tire has a pattern which does not change even though the tire is rotated by 180 degrees, namely, a symmetric pattern, so that the two intermediate land portions 16 located on the both sides of the center land portion 14 have the same void ratio, and are set to have the ground contact areas 16A having the same radius of curvature.

In contrast, the shoulder land portions 18 and 18 do not protrude from the reference contour line L, that is, ground contact areas 18A of the shoulder land portions 18 are located on the reference contour line L.

Here, the reference contour line L is a curve as a reference that defines a tread surface in a cross section taken along the tire width direction W, and can generally be considered to be the same as a design profile of a tire tread formed of a curve formed by connecting a plurality of arcs at contact points having a common tangent. Specifically, the reference contour line L is a curve including one or the plurality of arcs passing through opening ends of the respective main grooves 12 (edges of the respective land portions 14, 16, and 18) and continuing smoothly and when the opening ends of all the main grooves 12 are on a single arc for example, the arc corresponds to the reference contour line L. However, since the opening ends of all the main grooves 12 are generally not on the single arc, the reference contour line L are formed of a plurality of arcs and are defined as follows. As illustrated in FIG. 3, in the center land portion 14, both edges a and b of the center land portion 14 and edges c and d of the intermediate land portions 16 adjacent to each other with the central main grooves 12A interposed therebetween are obtained, and the arc which has a larger radius of curvature, either the arc passing through the points a, b, and c or an arc passing through the points a, b, and d, is determined as the reference contour line L. This is because the center land portion 14 basically has a large radius of curvature, and hence the arc having a larger radius of curvature is generally similar to the design profile for the center land portion 14. In the intermediate land portion 16, an arc passing through both edges d and e of the land portion 16 and the edge b of the center land portion 14 adjacent thereto with the central main grooves 12A interposed therebetween, namely three points b, d, and e, is defined as the reference contour line L. The design profile is composed of an arc having a radius of curvature reduced as it goes away from the tire equatorial plane CL. Therefore, if the reference contour line L in the intermediate land portion 16 is defined by an arc passing though an edge f of the shoulder land portions 18 adjacent thereto on the outside thereof, the reference contour line L may become too much smaller than the arc of the design profile. Therefore, definition is made by using the edge b of the center land portion 14 adjacent thereto on the inner side.

As described above, in the pneumatic tire of this embodiment, the ground contact area 14A of the center land portion 14 and the ground contact areas 16A of the intermediate land portions 16 are formed of arc shapes passing through two points of edges on both sides of the land portions 14, 16, and 16 in the tire width direction, and are formed to have cross-sectional arc shapes protruding outward and having apexes at centers in the tire width direction W. Therefore, ground contact stability when the pneumatic tire is subjected to a load and a lateral force is improved compared with the case where the apexes are set to a position shifted from the center in the width direction.

The land portion having a larger ratio between surface area A of the ground contact area in the area interposed between the main grooves 12 adjacent in the tire width direction and opening surface area a of the lateral grooves 20 provided on the land portion located in that area (void ratio: a/A) has less rigidity due to the presence of the lateral grooves 20 and hence is easily subjected to uneven wear. However, according to the pneumatic tire of this embodiment, the land portions 16 having a larger void ratio are increased in rigidity by forming the ground contact areas 16A to have a cross section in the width direction having a smaller radius of curvature, and hence the balance of rigidity may be uniformized even though the void ratio is different among the respective land portions 14 and 16, and improvement of the road-hugging property and restriction of uneven wear are achieved.

The case where the center land portion 14 and the pair of intermediate land portions 16 and 16 are formed between the main grooves 12 by the provision of the four main grooves 12 has been described thus far in the embodiment described above. However, the number of the main grooves is not limited to four as long as a plurality of land portions formed between the main grooves are provided, and may be three or five, for example.

The case where both of the intermediate land portions 16 located on the both sides of the center land portion 14 have the same void ratio and the radius of curvatures and the protruding amounts from the reference contour line L of the ground contact areas 16A are set to be the same has been described in this embodiment. However, if the void ratios of the pair of intermediate land portions 16 and 16 are different from each other, the cross-sectional shape of the ground contact area may be set so that the radius of curvature of the ground contact area is decreased with an increase of the void ratio.

Although several embodiments has been described, these embodiments are intended for illustration only, and are not intended to limit the scope of the invention. These novel embodiments may be implemented in other various modes, and various omissions, replacements, and modifications may be made without departing from the gist of the invention.

EXAMPLE

Although the invention will be described below further specifically with Example, the invention is not limited to Example.

Pneumatic radial tires (215/55R17) of Example and Comparative Examples 1 and 2 are manufactured by way of trial. These tires of trial manufacture have the same basic tread pattern and the internal structure of the tire, and are manufactured by changing the cross-sectional shapes of the ground contact areas 14A and 16A of the center land portion 14 and the intermediate land portions 16 and 16.

Specifically, configurations of Comparative Examples 1, 2 and Example have four main grooves illustrated in FIG. 2, and have the center land portion 14 having void ratio Xa of 15% and the intermediate land portions 16 and 16 having void ratio Xb of 18%. Comparative Example 1 is an example in which the protruding amounts of the center land portion 14 and the intermediate land portions 16 and 16 from the reference contour line L are the same, and cross-sectional shapes of the ground contact areas 14A and 16A of the center land portion 14 and the intermediate land portions 16 and 16 are formed into a triangular shape having an apex at the center in the tire width direction W. Comparative Example 2 is an example in which the protruding amounts of the ground contact areas 16A of the intermediate land portions 16 having a larger void ratio from the reference contour line L are set to be larger than that of the ground contact area 14A of the center land portion 14 having a smaller void ratio, and cross-sectional shapes of the ground contact areas 14A and 16A of the center land portion 14 and the intermediate land portions 16 and 16 are formed into a triangular shape having an apex at the center in the tire width direction W.

Example is an example in which the ground contact areas 16A of the intermediate land portions 16 having a larger void ratio have an arc shape having a radius of curvature of 175 mm, and the ground contact area 14A of the center land portion 14 having a smaller void ratio has an arc shape having a radius of curvature of 225 mm, the ground contact area 16A is formed into an arc shape having a smaller radius of curvature than that of the ground contact area 14A, and the protruding amount from the reference contour line L of the ground contact areas 16A is set to be larger than that of the ground contact area 14A.

Uneven wear resistance performances and changes of dispersion in ground contact pressure of the respective pneumatic tires of Example and Comparative Examples 1 and 2 were evaluated. The method of evaluation is as follows.

(1) Uneven Wear Resistance Performance (Index)

An amount of wear of a tire after traveling of 15000 km on a dry road was measured, a ratio of wear (=minimum amount of wear/maximum amount of wear) was calculated for each land portion, and converted into indexes obtained by setting the value of Comparative Example 1 to 100. A larger index indicates better uneven wear resistance performance.

(2) Change of Dispersion in Ground Contact Pressure

A dispersion value of a ground contact pressure within a ground contact area was calculated from a ground contact pressure measured by assembling a test tire to a regular rim and filling the tire with a regular inner pressure and pressing a pressure-sensitive paper against the tire at 70% the maximum load described in JATMA and a ground contact pressure measured by pressing the tire against the pressure sensitive paper at a camber angle (angle around a fore-and-aft axis (X axis) of the tire) of 1°, and the amount of change was converted into an index. A larger index indicates that the dispersion in ground contact pressure can hardly be changed, and ground contact stability is superior when being subjected to a load and a lateral force is achieved.

TABLE 1

|  | Example | Comparative Example 1 | Comparative Example 2 |
| --- | --- | --- | --- |
| Uneven Wear Resistance Performance | 102 | 100 | 102 |
| Change of Dispersion in Ground Contact Pressure | 100 | 100 | 98 |

The result is shown in Table 1. Comparative Example 2 is an example in which the protruding amounts of the ground contact areas 16A of the intermediate land portions 16 having a larger void ratio from the reference contour line L are set to be larger than that of the ground contact area 14A of the center land portion 14 having a smaller void ratio, so that the uneven wear resistance performance is improved to be better than that in Comparative Example 1. However, since the cross-sectional shapes of the ground contact areas 14A and 16A were formed into a triangular shape having an apex at the center in the tire width direction W, the ground contact stability when being subjected to a load and a lateral force was deteriorated. In contrast, in Example, the ground contact stability when being subjected to a load and a lateral force was not deteriorated, and the uneven wear resistance performance was improved in comparison with Comparative Example 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pneumatic tire comprising:
a tread portion;
three or more main grooves provided on the tread portion at intervals in a tire width direction so as to extend in a tire circumferential direction; and
a plurality of land portions partitioned between the main grooves adjacent to each other in the tire width direction,
wherein the plurality of land portions includes a first land portion and a second land portion,
wherein each of the first land portion and the second land portion includes a ground contact area having an arc shape in cross section in the tire width direction and a depressed portion forming an opening in the ground contact area,
wherein a void ratio of the first land portion is larger than a void ratio of the second land portion,
wherein the void ratio of the first land portion is a ratio of a surface area of the opening in the ground contact area formed by the depressed portion of the first land portion relative to an area between the two grooves partitioning the first land portion,
wherein the void ratio of the second land portion is a ratio of a surface area of the opening in the ground contact area formed by the depressed portion of the second land portion relative to an area between the two grooves partitioning the second land portion,
wherein the arc shape of the ground contact area of the first land portion is smaller in radius of curvature than the arc shape of the ground contact area of the second land portion,
wherein each of the first land portion and the second land portion has a protruding amount from a reference contour line at an edge of the ground contact area to an apex of the ground contact area, the protruding amount of the first land portion being larger than the protruding amount of the second land portion, and
wherein the depressed portion in each of the first land portion and the second land portion includes a lateral groove with a groove width of more than 1 mm, the lateral groove in each of the first land portion and the second land portion being at a same inclination from the tire width direction, the lateral groove in the first land portion extending from one of the main grooves adjacent to the first land portion across a center of the first land portion and ending before reaching another one of the main grooves adjacent to the first land portion, and the lateral groove in the second land portion extending from each of the main grooves adjacent to the second land portion and ending before a center of the second land portion.

2. The pneumatic tire according to claim 1,
wherein the main grooves include a pair of central main grooves and a shoulder main groove adjacent to one of the pair of central main grooves,
wherein the first land portion is an intermediate land portion partitioned between the shoulder main groove and the one of the pair of central main grooves adjacent to the shoulder main groove, and
wherein the second land portion is a central land portion partitioned between the pair of central main grooves.

3. A pneumatic tire comprising:
a tread portion;
three or more main grooves provided on the tread portion at intervals in a tire width direction so as to extend in a tire circumferential direction; and
a plurality of land portions partitioned between the main grooves adjacent to each other in the tire width direction,
wherein the plurality of land portions includes a first land portion and a second land portion,
wherein each of the first land portion and the second land portion includes a ground contact area having an arc shape in cross section in the tire width direction and a depressed portion forming an opening in the ground contact area,
wherein a void ratio of the first land portion is larger than a void ratio of the second land portion,
wherein the void ratio of the first land portion is a ratio of a surface area of the opening in the ground contact area formed by the depressed portion of the first land portion relative to an area between the two grooves partitioning the first land portion,
wherein the void ratio of the second land portion is a ratio of a surface area of the opening in the ground contact area formed by the depressed portion of the second land portion relative to an area between the two grooves partitioning the second land portion,
wherein the arc shape of the ground contact area of the first land portion is smaller in radius of curvature than the arc shape of the ground contact area of the second land portion, and
wherein the depressed portion in each of the first land portion and the second land portion includes a lateral groove with a groove width of more than 1 mm, the lateral groove in each of the first land portion and the second land portion being at a same inclination from the tire width direction, the lateral groove in the first land portion extending from one of the main grooves adjacent to the first land portion across a center of the first land portion and ending before reaching another one of the main grooves adjacent to the first land portion, and the lateral groove in the second land portion extending from each of the main grooves adjacent to the second land portion and ending before a center of the second land portion.

* * * * *